(12) United States Patent
Gardner et al.

(10) Patent No.: US 7,558,157 B1
(45) Date of Patent: Jul. 7, 2009

(54) SENSOR SYNCHRONIZATION USING EMBEDDED ATOMIC CLOCKS

(75) Inventors: Kenneth R. Gardner, Rochester, NY (US); Fred Yacoby, Honeoye Falls, NY (US); Paul P. Lee, Pittsford, NY (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 295 days.

(21) Appl. No.: 11/412,023

(22) Filed: Apr. 26, 2006

(51) Int. Cl.
*G04B 47/00* (2006.01)
*G01V 1/22* (2006.01)

(52) U.S. Cl. .................... 368/10; 73/152.46; 367/76
(58) Field of Classification Search ................ 368/10, 368/11, 155, 156; 73/152.43, 152.46; 367/76, 367/81
See application file for complete search history.

(56) References Cited

U.S. PATENT DOCUMENTS

| | | | | |
|---|---|---|---|---|
| 4,281,403 A * | 7/1981 | Siems et al. | | 367/76 |
| 5,555,220 A * | 9/1996 | Minto | | 367/86 |
| 5,623,455 A * | 4/1997 | Norris | | 367/76 |
| 5,706,250 A * | 1/1998 | Rialan et al. | | 367/77 |
| 6,002,640 A * | 12/1999 | Harmon | | 367/38 |
| 6,024,344 A * | 2/2000 | Buckley et al. | | 367/76 |
| 6,332,109 B1 * | 12/2001 | Sheard et al. | | 702/11 |
| 6,337,636 B1 * | 1/2002 | Page et al. | | 340/870.13 |
| 6,553,316 B2 * | 4/2003 | Bary et al. | | 702/16 |
| 6,581,110 B1 | 6/2003 | Harif et al. | | |
| 6,614,718 B2 * | 9/2003 | Cecconi et al. | | 367/86 |
| 6,657,921 B1 * | 12/2003 | Ambs | | 367/20 |
| 6,837,105 B1 * | 1/2005 | DiFoggio et al. | | 73/152.46 |
| 6,912,465 B2 * | 6/2005 | Collins et al. | | 702/6 |
| 6,976,392 B2 * | 12/2005 | DiFoggio et al. | | 73/152.46 |
| 7,124,028 B2 * | 10/2006 | Ray et al. | | 702/1 |
| 7,310,287 B2 * | 12/2007 | Ray et al. | | 367/188 |
| 2004/0056796 A1 | 3/2004 | Brenner et al. | | |
| 2005/0007450 A1 | 1/2005 | Hill et al. | | |
| 2005/0122839 A1 | 6/2005 | DiFoggio et al. | | |
| 2005/0240086 A1 | 10/2005 | Akay | | |
| 2006/0255281 A1 * | 11/2006 | Lal et al. | | 250/370.11 |

\* cited by examiner

*Primary Examiner*—Vit W Miska
(74) *Attorney, Agent, or Firm*—RatnerPrestia

(57) ABSTRACT

A data acquisition system includes multiple terminal nodes. Each terminal node includes a sensor, an atomic clock and a controller. Each sensor is adapted to sense an external event and transform the external event into an electrical signal. Each atomic clock generates a time reference. Each controller is coupled to the atomic clock and the sensor, and is configured to merge the electrical signal with the time reference and provide a time-stamped data stream to a remote central processor. The remote central processor is configured to organize a respective time-stamped data stream from one terminal node with another respective time-stamped data stream from another terminal node.

12 Claims, 5 Drawing Sheets

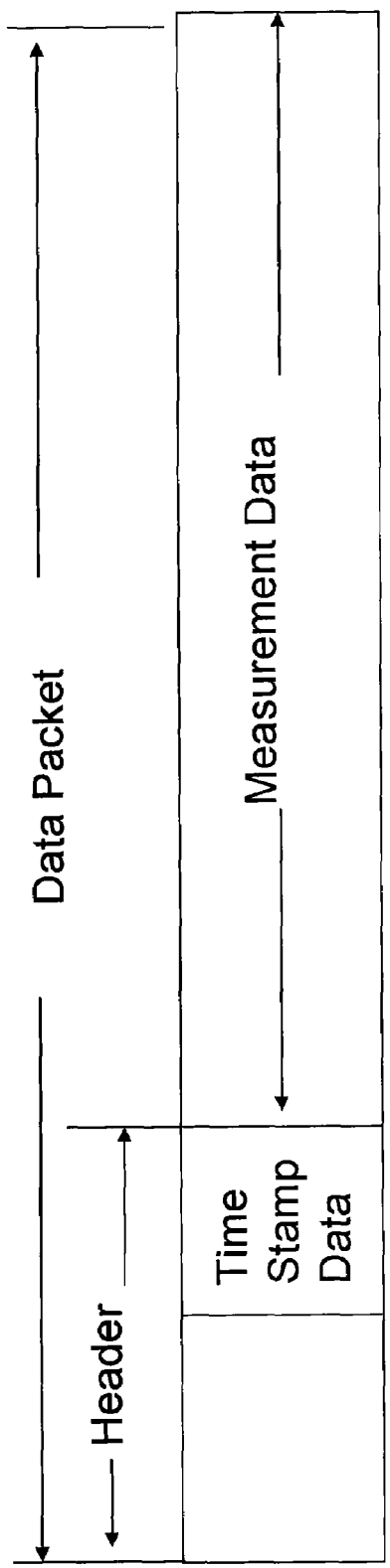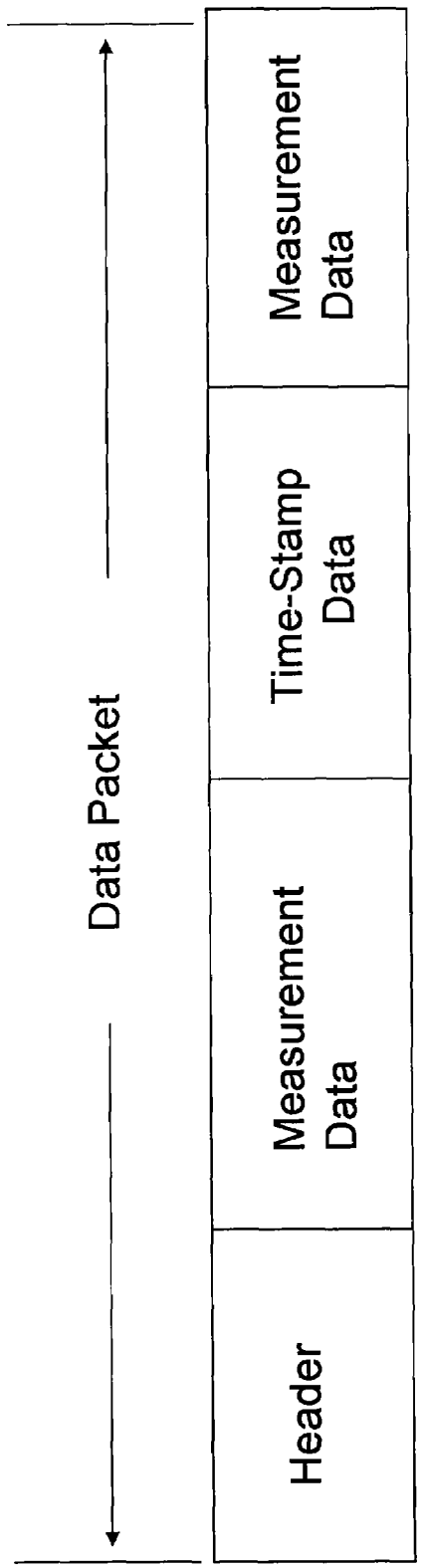
FIG. 5A
FIG. 5B

SENSOR SYNCHRONIZATION USING EMBEDDED ATOMIC CLOCKS

FIELD OF THE INVENTION

The present invention relates to a system and method of synchronizing data using an embedded atomic clock.

BACKGROUND OF THE INVENTION

A variety of data systems depend upon accurate time synchronization for arrangement, correlation and interpretation of data streams pooled from multiple sources or a single source. Accurate time-stamping of the independently collected sensor data streams is often necessary in order to correlate individual data elements. The data acquisition system may be a semiconductor manufacturing system, a large network enterprise, a Global Positioning System (GPS), an automotive system, a vibration analysis system, an optical system, or any other system including at least one sensor. Keeping consistent time across a data system is a necessity for many applications, as illustrated by the following example.

In a vibration analysis system including multiple vibration sensors, each sensor transmits data via cable to a central processor. The central processor receives the data, time-stamps the data, arranges the data according to the time-stamps, and interprets the data to derive a vibration profile. In this example, each vibration sensor is coupled to a separate cable, each cable having a different length. Therefore, by the time the vibration sensor data travel through the cables of unequal length and reach the central processor, the data packets are out of time sequence, thereby corrupting the results of the vibration analysis.

Multiple data collection platforms and multiple data sensors for Air/Ground/Space assets are non-synchronous and cannot support synchronous communication. Thus, large volumes of independent data cannot be easily and/or accurately correlated. Extensive engineering effort is typically required to correct for unavoidable phase delays and time errors.

Uncertainties caused by atmospheric fluctuations, transmission medium variations, electromagnetic interference (EMI), and intentional jamming disrupt the quality of the transmission and further degrade the time accuracy which cannot be modeled. Furthermore, timing standardization is difficult or impossible to achieve due a wide variety of timing circuits, equipment manufacturers, and hardware configurations.

The Defense Advanced Research Projects Agency (DARPA) is currently developing a solid-state atomic clock having a volume less than 0.1 cm$^3$ that consumes only a few milliwatts of power. By using micro-electro-mechanical systems (MEMS) chip fabrication technology, it is now possible to produce a miniaturized atomic clock. The atomic clock is fabricated using micro fabrication techniques and is mounted on a standardized integrated chip package. This so called chip scale atomic clock (CSAC) consumes very little power, runs independently, and is expected to be relatively inexpensive compared to the exorbitant price of a larger atomic clock. Once synchronized, the chip scale atomic clock has an accuracy based upon hyperfine transitions of the Rubidium-87 atom, (for example).

SUMMARY OF THE INVENTION

According to one exemplary embodiment, a data acquisition system including a plurality of terminal nodes is provided. Each terminal node includes a sensor, an atomic clock and a controller. Each sensor of a node is adapted to sense an external event and transform the external event into an electrical signal. Each atomic clock of a node generates a time reference. Each controller of a node is coupled to the atomic clock and the sensor, and is configured to merge the electrical signal with the time reference and provide a time-stamped data stream to an external central processor. The external central processor is configured to organize a respective time-stamped data stream from one terminal node with another respective time-stamped data stream from another terminal node.

According to another exemplary embodiment, an atomic clock integrated sensor assembly is provided. The sensor assembly includes a sensor, a controller and an atomic clock, each disposed on a single substrate. The sensor is adapted to sense an external event and transform the external event into an electrical signal. The atomic clock generates a time reference. The controller is coupled to the atomic clock and the sensor and is configured to merge the electrical signal with the time reference and provide a time-stamped data stream to an external data processor. The data processor is configured to organize a respective time-stamped data stream from one terminal node with another respective time-stamped data stream from another terminal node.

According to another exemplary embodiment, a method of correlating time-stamped data packets is provided. The method includes the steps of sensing an external event and transforming the external event into an electrical signal by a sensor. The signal is time-stamped using an atomic clock that generates a time reference and is co-located with the sensor. The time-stamped signal is transmitted to a central processor, wherein the central processor includes an atomic clock that is synchronized in time with the atomic clock co-located with the sensor. The transmitted time-stamped signal is compared with a time reference generated by the atomic clock of the central processor, and both time-stamped signals are sorted in time sequence.

BRIEF DESCRIPTION OF THE DRAWING

The invention is best understood from the following detailed description when read in connection with the accompanying drawing. Included in the drawing are the following figures:

FIG. 5A is a block diagram of an exemplary embodiment of a data packet; and

FIG. 5B is a block diagram of another exemplary embodiment of a data packet.

DETAILED DESCRIPTION OF THE INVENTION

Although the invention is illustrated and described herein with reference to specific embodiments, the invention is not intended to be limited to the details shown. Rather, various modifications may be made in the details within the scope and range of equivalents of the claims and without departing from the invention.

In order to reliably and accurately accomplish the transmission (and subsequent fusion) of error-free data from a suite of independent sensors or a multi-platform array of individually operating data collection systems, it is advantageous that each of the data elements be time-stamped at the point of measurement, so that the data elements become effectively synchronized in time.

Figure 1:
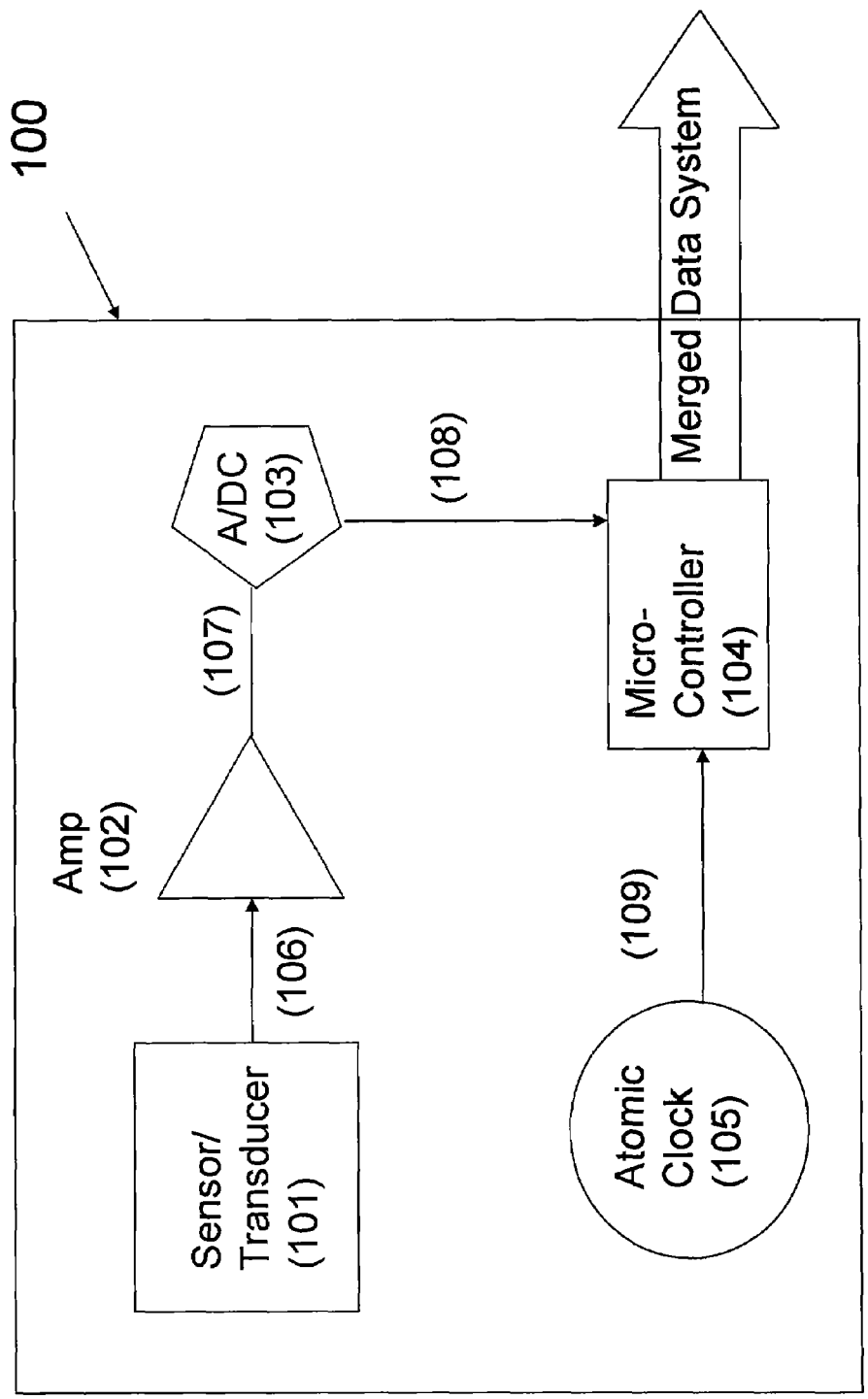
FIG. 1 is a block diagram of an exemplary embodiment of an integrated atomic clock sensor according to aspects of this invention.

Referring to the exemplary embodiment illustrated in FIG. 1, an atomic clock integrated sensor is designated generally by the numeral 100. The integrated sensor 100 includes sensor transducer 101, which may be an accelerometer, thermocouple, strain gauge, or pressure transducer, for example. The transducer detects and transforms an external event sensed by the sensor (such as acceleration) into an electrical signal which is transmitted through local wiring 106 to amplifier 102 for amplification and signal conditioning. Such signal conditioning may include noise filtering. The conditioned signal is transmitted through local wiring 107 and converted into digital form by analog-to-digital converter (ADC) 103. The digital signal is then transmitted through local wiring 108 to a local digital microcontroller 104 or any other data formatter.

An atomic clock 105 generates a time signal which is transmitted via local wiring 109 to digital microcontroller 104. The microcontroller 104 time-stamps the data received from sensor/transducer 101 using the time provided by atomic is clock 105. The signals from both ADC 103 and atomic clock 105 are merged into a single data stream 110 by microcontroller 104. It should be understood that ADC 103 and amplifier 102 are optional components.

The data stream 110 includes time-stamped packets of data. Two exemplary embodiments of data packets are illustrated in FIGS. 5A and 5B. The data packet illustrated in FIG. 5A includes measurement data and time-stamp data integrated within the header of the data packet. Alternatively, the time-stamp data may be integrated with the sensor data as a packet of data with a header pointing, respectively, to the sensor data and the time-stamp data, as illustrated in FIG. 5B.

A small time delay exists between the point of measurement at sensor/transducer 101 and the point in which the measurement data is time-stamped by micro-controller 104. However, any such time delay is measurable and quantifiable. Since the time delay is a known quantity, it may easily be accounted for at the transmission end of the measurement data stream or at the reception end of the measurement data stream.

The present invention advantageously time-stamps the transmitted data by embedding atomic clock data into the sensor data stream at the point of measurement. As shown, atomic clock 105 is co-located at the sensor, that is, the atomic clock is embedded with a sensor on one single substrate, such as an integrated hybrid circuit. As a result of miniaturization and solid state advances in atomic clocks, it is possible to package an atomic clock directly with a sensor/transducer on a single substrate. However, it should be understood that the present invention is not limited to integration on a single substrate, and may be separately packaged and integrated at the point of measurement.

Figure 2:
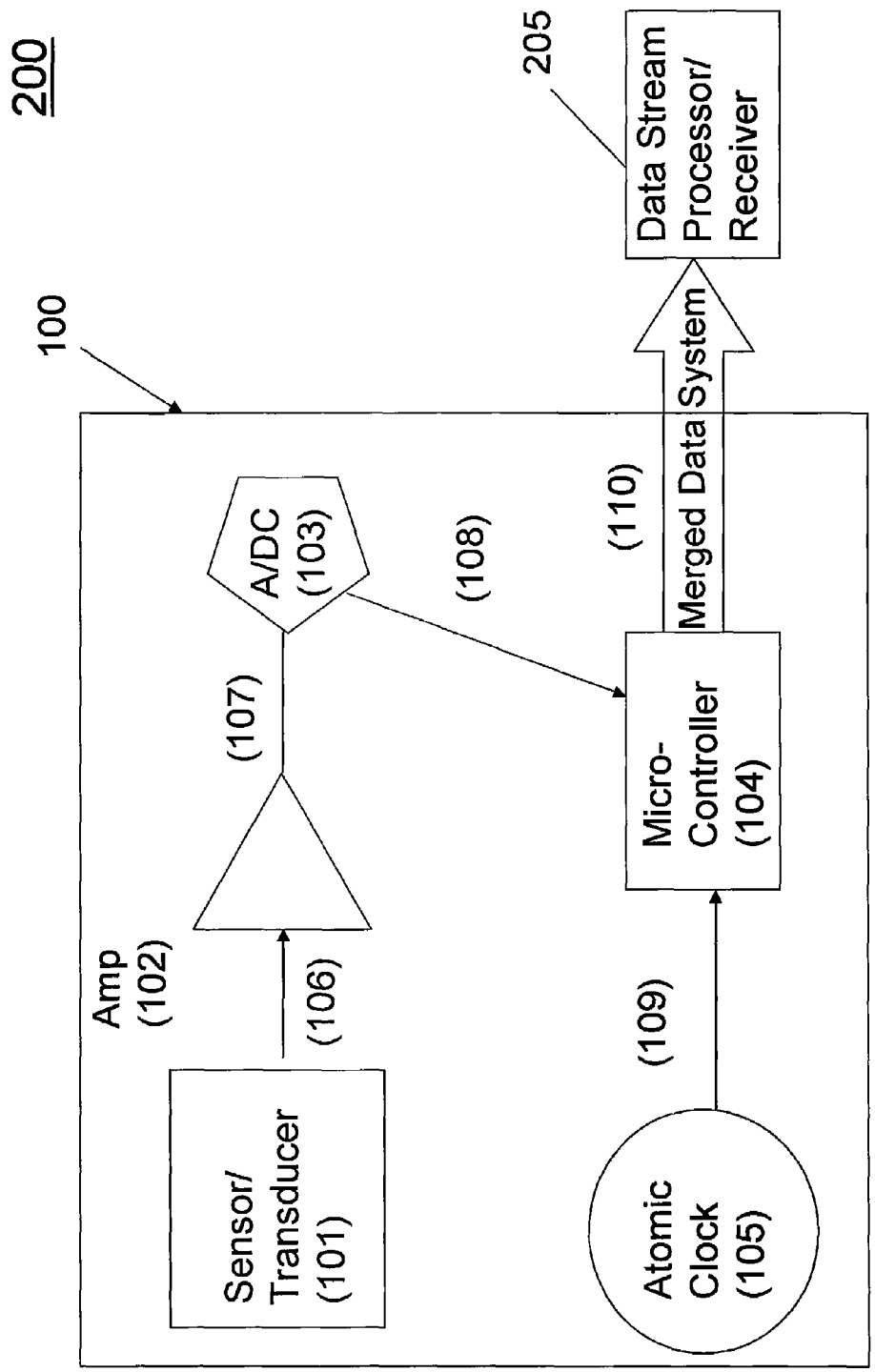
FIG. 2 is a block diagram of an exemplary embodiment of a data acquisition system according to aspects of this invention.

Referring now to the exemplary embodiment illustrated in FIG. 2, data acquisition system 200 includes atomic clock integrated sensor 100 and data stream receiver/processor 205. The data stream receiver/processor 205 is configured to record, reduce, correlate, and/or interpret data stream 110. The data stream receiver/processor 205 is optionally placed at a remote location. The data stream receiver/processor may be a computer processor, a recording medium, or any other receiving/processing system. The integrated sensor 100 may transmit data stream 110 to data stream receiver/processor 205 via hard wires, wireless radio transmission, TCP Internet Protocol (IP) using the Internet, or any other form of data transmission.

The integrated sensor 100 may be disposed in orbit on a satellite, on the ground, or on an aircraft. Similarly, data stream receiver/processor 205 may be disposed in orbit on a satellite, or on a vehicle, such as an aircraft or truck. It may also be stationary on the ground. Although not illustrated, it will be appreciated that a transmitter, which may be integrated into sensor 100, is used to transmit data stream 110 to data stream receiver/processor 205.

In contrast to a conventional data acquisition system, data stream receiver/processor 205 receives data that is time-stamped. Thus, any delays resulting from unpredictable atmospheric fluctuations, high temperatures, transmission medium variations, EMI, or intentional jamming, for example, may be disregarded, because the time at the point of measurement is precisely known. The present invention is particularly advantageous when the data acquisition system requires more than one sensor data acquisition.

Figure 3:
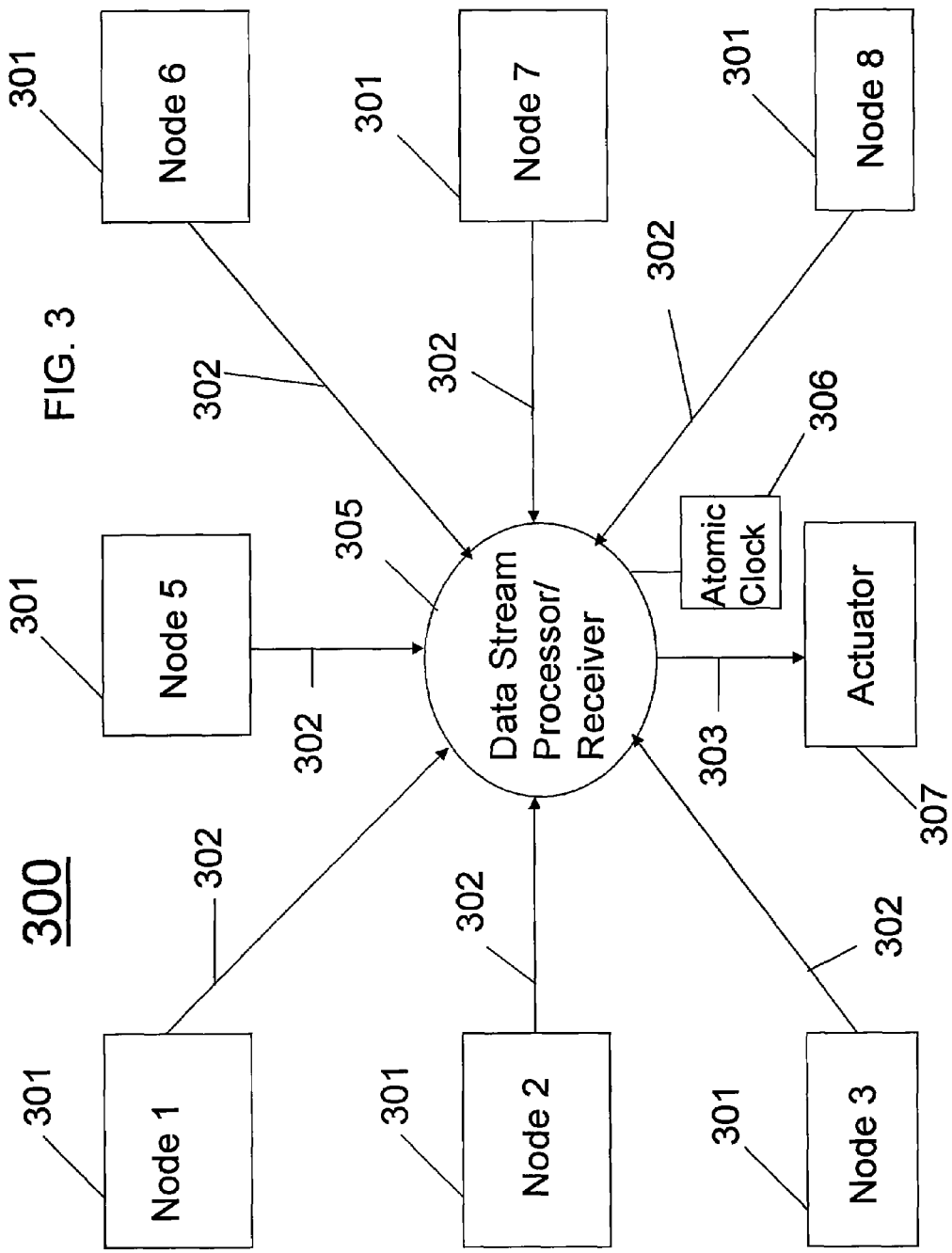
FIG. 3 is a block diagram of another exemplary embodiment of a data acquisition system including multiple nodes according to aspects of this invention.

Referring now to FIG. 3, an exemplary embodiment of another data acquisition system 300 is illustrated. The data acquisition system 300 includes a plurality of nodes, each designated as 301, and central data receiver/processor 305. Each node 301 includes an atomic clock integrated with a sensor/transducer, which may be similar to sensor 100 illustrated in FIG. 1. Each node 301 transmits a time-stamped data stream 302 to central data receiver/processor 305 via hard wires, wireless radio transmission, TCP Internet Protocol, or any other form of data transmission.

The central data receiver/processor 305 receives each data stream 302 and organizes the data streams according to their respective corresponding time-stamp. The central data receiver/processor 305 may optionally include its own co-located atomic clock 306. The central data receiver/processor 305 may optionally transmit the organized data stream 303 to actuator 307. The actuator 307 may be any end user of the sensor data sensed at a respective node. The actuator 307 may include a data storage device, a computer processor to analyze the data stream, or a transmitter to send the organized data stream to yet another node.

The exemplary embodiment illustrated in FIG. 3 may include, for example, a Global Positioning System (GPS). In this example, central data receiver/processor 305 is a GPS receiver and each node 301 is a GPS satellite in orbit. Each node 301 includes an atomic clock. In addition, central data receiver/processor 305 also includes atomic clock 306. Each node 301 transmits a time-stamped pseudo-random code, as opposed to a conventional pseudo-random code without a time stamp. The central data receiver/processor 305 compares the time-stamped pseudo-random code 302 transmitted from nodes 301 with its own internal time-stamped pseudo-random code, and is able to lock on to the different GPS satellites (nodes 301) more easily. By embedding an atomic clock within central data receiver/processor 305 (GPS receiver), data correction and/or calibration is improved in comparison with a conventional GPS receiver not having an internal atomic clock.

In another non-limiting example, the exemplary embodiment illustrated in FIG. 3 is a vibration analysis system. The vibration analysis system includes nodes, each having an integrated vibration sensor and atomic clock. Each node 301 time-stamps the sensor data at the point of measurement and transmits data stream 302 to central data receiver/processor 305. The central data receiver/processor 305 arranges the data packets according to the time-stamps and reduces the data to derive a vibration profile. The central data receiver/processor may optionally transmit the vibration profile to actuator 307 for compensation.

There are several benefits to co-locating an atomic clock with a sensor. Using an atomic clock at each node allows for simple correlation of data among different nodes. A high degree of modularity is achieved by using an accurate timing standard. Separately time-stamped data packets, stamped at each point of measurement, supports asynchronous communication, found in TCP/IP and wireless protocols.

Figure 4:
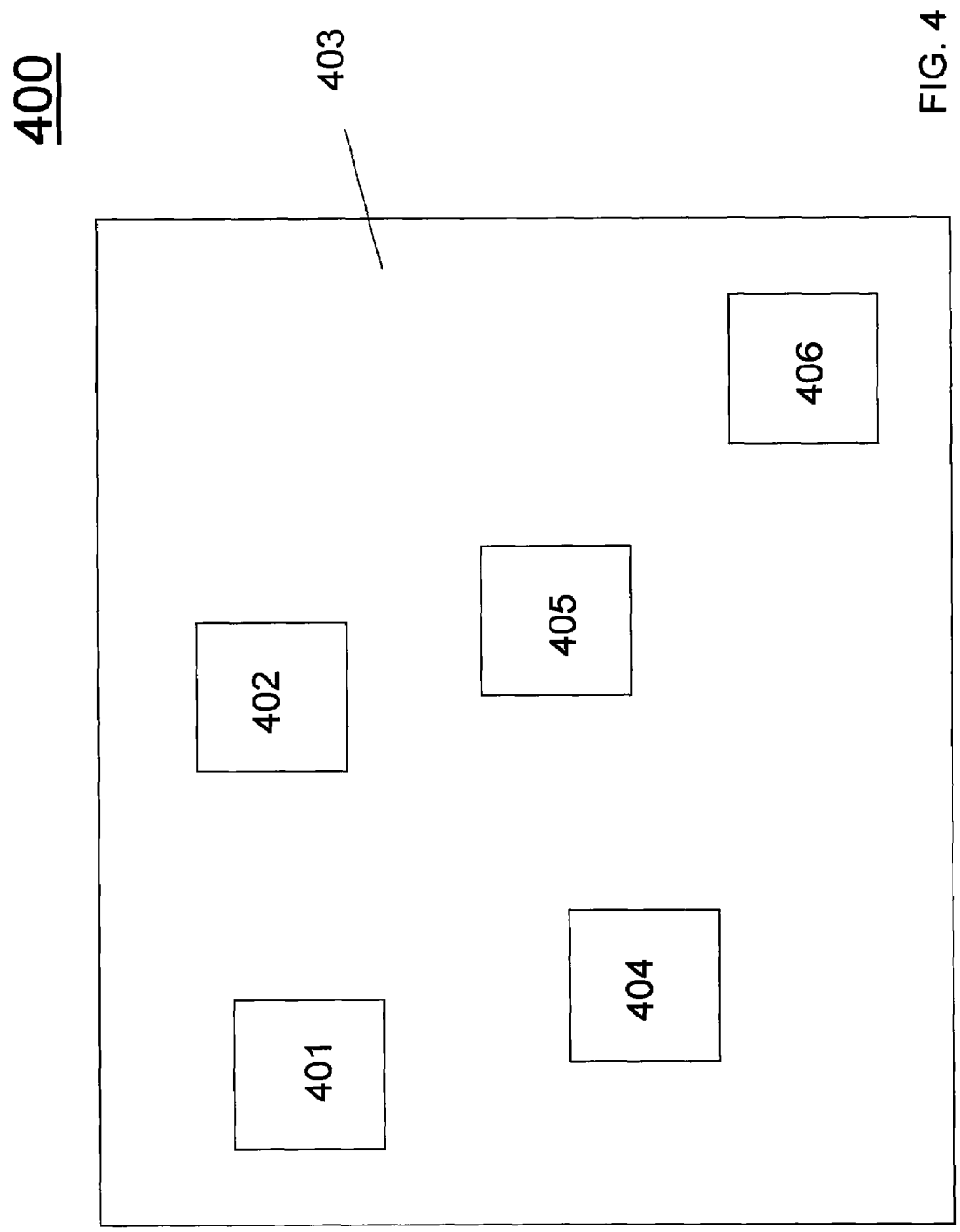
FIG. 4 is an exemplary embodiment of an integrated atomic clock and sensor, both mounted on a single substrate according to aspects of this invention.

Referring now to FIG. 4, an exemplary embodiment of an atomic clock integrated sensor assembly 400 is illustrated. The sensor assembly 400 includes two sensor transducers 401 and 402, controller 404 and atomic clock 405, all disposed on substrate 403. The substrate 403 may be a printed wiring board or an integrated circuit, for example.

The sensor transducers 401, 402 are adapted to sense external events and transform the external events into electrical signals. The atomic clock 405 generates a time reference. The controller 404 is coupled to atomic clock 405 and sensor transducers 401, 402. The controller is configured to merge the electrical signals with the time reference and provide a time-stamped data stream. A transmitter 406 is optionally provided on substrate 403 to transmit the data stream to an external receiver/processor, an external recording medium, or an external node. By way of a non-limiting example, sensor transducers 401 is a pressure transducer and sensor transducer 402 is a thermocouple.

It will be understood that atomic clock integrated sensor assembly 400 may include any number of sensor/transducers, and is not limited to having only two sensor/transducers, as shown in FIG. 4.

While preferred embodiments of the invention have been shown and described herein, it will be understood that such embodiments are provided by way of example only. It should be understood that this invention is not limited to any specific application or industry. Numerous variations, changes and substitutions will occur to those skilled in the art without departing from the spirit of the invention. Accordingly, it is intended that the appended claims cover all such variations as fall within the spirit and scope of the invention.

What is claimed is:

1. A data acquisition system comprising:
a plurality of terminal nodes, each terminal node including:
   a substrate,
   a sensor disposed on said substrate that is adapted to sense an external event and transform the external event into an electrical signal,
   an analog to digital converter disposed on said substrate and coupled to said sensor for transforming the electrical signal into a digital signal,
   a chip-scale atomic clock disposed on said substrate for generating a time reference,
   a controller disposed on said substrate and coupled to said atomic clock and said analog to digital converter, wherein for each external event said controller is configured to (i) merge said digital signal and a time reference corresponding to an external event into a time-stamped data stream; and (ii) adjust the time-stamped data stream to compensate for a pre-determined time delay occurring between that external event and the merging step, and
   a transmitter coupled to said controller for transmitting the time-stamped data stream via wireless radio transmission or internet protocol to a remote central processor; and
a remote central processor including a receiver for receiving the time-stamped data streams via wireless radio transmission or internet protocol from each terminal node, wherein said remote central processor is configured to synchronize, arrange or analyze the time-stamped data streams from the plurality of terminal nodes based upon the time reference of each time-stamped data stream.

2. The data acquisition system of claim 1, wherein said sensor is a pressure transducer.

3. The data acquisition system of claim 1, wherein said sensor is an accelerometer.

4. The data acquisition system of claim 1, wherein each time-stamped data stream includes time-stamp data embedded in a header of a data packet.

5. The data acquisition system of claim 1, wherein each time-stamped data stream includes time-stamp data interleaved with data associated with the external event in a data packet.

6. The data acquisition system of claim 1 further comprising an actuator coupled to said central processor, wherein said central processor transmits said time-stamped data stream to said actuator for actuator control, analysis or storage.

7. A chip-scale atomic clock integrated sensor assembly comprising:
   a substrate;
   at least one sensor disposed on said substrate and adapted to sense an external event and transform the external event into an electrical signal;
   an analog to digital converter disposed on said substrate and coupled to said sensor for transforming the electrical signal into a digital signal;
   a chip-scale atomic clock disposed on said substrate for generating a time reference;
   a controller disposed on said substrate and coupled to the atomic clock and the analog to digital converter, wherein for each external event said controller is configured to (i) merge said digital signal and a time reference corresponding to an external event into a time-stamped data stream; and (ii) adjust the time-stamped data stream to compensate for a pre-determined time delay occurring between that external event and the merging step; and
   a transmitter coupled to said controller for transmitting the time-stamped data stream via wireless radio transmission or internet protocol to a remote central processor.

8. The atomic clock integrated sensor assembly of claim 7, wherein said substrate is a printed wiring board.

9. The atomic clock integrated sensor assembly of claim 7, wherein said substrate is an integrated circuit.

10. The atomic clock integrated sensor assembly of claim 7 further comprising at least two sensors disposed on said substrate, wherein each sensor is adapted to sense an external event and transform the external event into an electrical signal.

11. The atomic clock integrated sensor assembly of claim 10, wherein said analog to digital converter transforms both electrical signals into a digital signal, and said controller is configured to merge said digital signals with said time reference.

12. A method of correlating time-stamped data packets comprising the steps of:
   (a) sensing external events at multiple federal locations and transforming the external events into electrical signals;

(b) converting the electrical signals into a digital signals;
(c) time-stamping each of the digital signals using a time reference generated by an atomic clock co-located at each of the multiple federated locations;
(d) accounting for a pre-determined time delay occurring between steps (a) and (c) and adjusting the time-stamped signals to compensate for the pre-determined time delay for each time stamped signal;
(e) transmitting each of the time-stamped signals from each of the multiple federated locations to a remote central processor;
(f) receiving each of the time-stamped signals at the remote central processor, wherein the remote central processor includes an atomic clock that generates a time reference for synchronization with a respective atomic clock co-located at each of the multiple federated locations;
(g) comparing each of the multiple federated time-stamped signals with the time reference generated by the remote central processor.

\* \* \* \* \*